(12) United States Patent
Zielinski et al.

(10) Patent No.: US 9,676,346 B2
(45) Date of Patent: Jun. 13, 2017

(54) TRIM DAMPENING FASTENER

(71) Applicant: Toyota Motor Engineering & Manufacturing North America, Inc., Erlanger, KY (US)

(72) Inventors: Eric J. Zielinski, Plymouth, MI (US); Allan A. Pett, Farmington Hills, MI (US); Eric M. Ehlert, Taylor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/729,352

(22) Filed: Jun. 3, 2015

(65) Prior Publication Data
US 2016/0355147 A1 Dec. 8, 2016

(51) Int. Cl.
| | |
|---|---|
| *B60R 13/02* | (2006.01) |
| *B60R 13/08* | (2006.01) |
| *F16B 39/26* | (2006.01) |
| *F16B 1/00* | (2006.01) |

(52) U.S. Cl.
CPC ............ *B60R 13/08* (2013.01); *B60R 13/02* (2013.01); *B60R 13/0206* (2013.01); *F16B 1/00* (2013.01); *F16B 39/26* (2013.01); *B60R 2013/0287* (2013.01); *B60R 2013/0807* (2013.01)

(58) Field of Classification Search
CPC ..... B60R 13/02; B60R 13/0206; B60R 13/08; B60R 2013/0287; B60R 2013/0807; F16B 13/0841; F16B 31/02; F16B 31/021; F16B 31/024; F16B 31/028; F16B 31/04; F16B 31/043; F16B 39/10; F16B 39/101; F16B 39/103; F16B 39/24; F16B 39/26; F16B 43/00; F16B 43/001
USPC ......... 411/8, 9, 10, 11, 12, 14.5, 371.2, 544, 411/546
See application file for complete search history.

(56) References Cited

U.S. PATENT DOCUMENTS

| | | | | |
|---|---|---|---|---|
| 2,457,058 | A | * | 12/1948 | Markowitz ........... F16F 1/3735 267/140.3 |
| 3,183,762 | A | * | 5/1965 | Poupitch ................. F16B 31/04 411/12 |

(Continued)

FOREIGN PATENT DOCUMENTS

| | | | |
|---|---|---|---|
| CN | 103899513 A | 7/2014 | |
| DE | 3237324 A1 * | 4/1984 | ............. B25B 29/02 |

(Continued)

*Primary Examiner* — Glenn Dayoan
*Assistant Examiner* — Paul Chenevert
(74) *Attorney, Agent, or Firm* — Dinsmore & Shohl LLP

(57) ABSTRACT

A fastener with an dampener is provided. The dampener is integrated with the fastener thus eliminating the need for an additional dampener installation. The fastener includes a shaft, a head connected to the shaft, and a dampener connected to the head. The dampener includes a piston and a compression chamber that is adapted to reduce vibration and noise when installed between two panels. The dampener is mounted to the underside of the head of a bolt, or to a trim piece. In other embodiments, the dampener is connected to the head of a clip. The dampener is adapted to rest between the head of a bolt and an adjacent panel thereby slightly spacing out the bolt head from the panel, such as sheet metal.

20 Claims, 3 Drawing Sheets

(56) References Cited

U.S. PATENT DOCUMENTS

| | | | | |
|---|---|---|---|---|
| 3,316,338 A * | 4/1967 | Rieke | B05D 3/02 | 264/267 |
| 3,323,403 A * | 6/1967 | Waisman | F16B 31/028 | 411/10 |
| 3,435,724 A * | 4/1969 | Trungold | F16B 31/043 | 411/10 |
| 3,463,044 A * | 8/1969 | Hudgins | F16B 4/002 | 411/391 |
| 4,061,073 A * | 12/1977 | Easter | F16B 31/028 | 280/756 |
| 4,138,198 A * | 2/1979 | Brown | F16B 39/24 | 29/525.02 |
| 4,182,189 A * | 1/1980 | Dock | B23K 20/085 | 116/DIG. 34 |
| 4,289,061 A * | 9/1981 | Emmett | F16B 5/0258 | 411/10 |
| 4,310,273 A * | 1/1982 | Kirrish | F16B 5/0233 | 411/338 |
| 4,398,984 A * | 8/1983 | Uchiyama | B60J 5/042 | 156/196 |
| 4,681,493 A * | 7/1987 | Vollmer | F16B 13/066 | 411/19 |
| 4,720,223 A * | 1/1988 | Neights | B25B 13/481 | 411/11 |
| 4,858,880 A * | 8/1989 | Durand | B60G 99/004 | 248/635 |
| 5,096,153 A * | 3/1992 | Seeley | F16F 3/0873 | 248/635 |
| 5,180,268 A * | 1/1993 | Richardson | B23Q 1/4828 | 411/149 |
| 5,390,769 A | 2/1995 | Bair et al. | | |
| 5,468,106 A * | 11/1995 | Percival-Smith | F16B 31/043 | 277/649 |
| 5,743,509 A * | 4/1998 | Kanda | F16F 1/38 | 248/634 |
| 6,196,607 B1 * | 3/2001 | Gulisano | B60R 13/01 | 293/115 |
| 6,227,784 B1 * | 5/2001 | Antoine | F02B 77/00 | 411/11 |
| 6,238,157 B1 * | 5/2001 | Davis, Jr. | B60R 13/0206 | 24/324 |
| 6,302,385 B1 * | 10/2001 | Summers, III | F16F 1/373 | 267/140.3 |
| 6,666,640 B1 * | 12/2003 | Hsieh | F16B 5/065 | 165/80.3 |
| 6,783,299 B2 * | 8/2004 | Meron | H01L 21/68728 | 269/91 |
| 7,059,659 B2 * | 6/2006 | Smith | B60J 5/0418 | 296/146.7 |
| 8,479,804 B2 * | 7/2013 | Liu | H01L 23/4006 | 165/104.26 |
| 8,523,922 B2 | 9/2013 | May et al. | | |
| 8,769,779 B2 * | 7/2014 | Lee | B60R 13/0206 | 24/292 |
| 2003/0185642 A1 * | 10/2003 | Imai | F16B 31/04 | 411/14.5 |
| 2011/0119875 A1 * | 5/2011 | Iwasaki | B60J 5/0468 | 24/458 |
| 2014/0086703 A1 * | 3/2014 | Thommes | F16B 39/24 | 411/247 |
| 2015/0030412 A1 * | 1/2015 | Hughes | F16B 39/26 | 411/262 |
| 2015/0063939 A1 * | 3/2015 | Marc | F16B 39/26 | 411/6 |
| 2015/0158437 A1 * | 6/2015 | Tuma | F16B 5/07 | 24/292 |

FOREIGN PATENT DOCUMENTS

| | | | | |
|---|---|---|---|---|
| DE | 3517620 A1 * | 11/1985 | | B60N 3/046 |
| DE | 4023747 A1 * | 1/1992 | | F16B 31/028 |
| DE | 4206690 A1 * | 9/1993 | | F16B 43/00 |
| DE | 19949369 A1 * | 4/2001 | | B60R 13/0206 |
| EP | 1717458 A1 | 11/2006 | | |
| FR | DE 1400898 A1 * | 5/1969 | | F16B 39/26 |
| FR | 2806683 A1 * | 9/2001 | | B60R 13/0206 |
| FR | 2993328 A1 * | 1/2014 | | B60R 13/0206 |
| GB | 674213 A * | 6/1952 | | F16B 39/24 |
| GB | EP 0129440 A1 * | 12/1984 | | F16B 31/043 |
| KR | 200149038 Y1 | 6/1999 | | |

\* cited by examiner

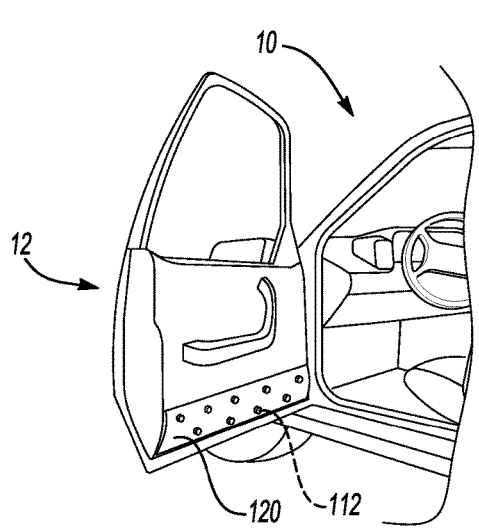
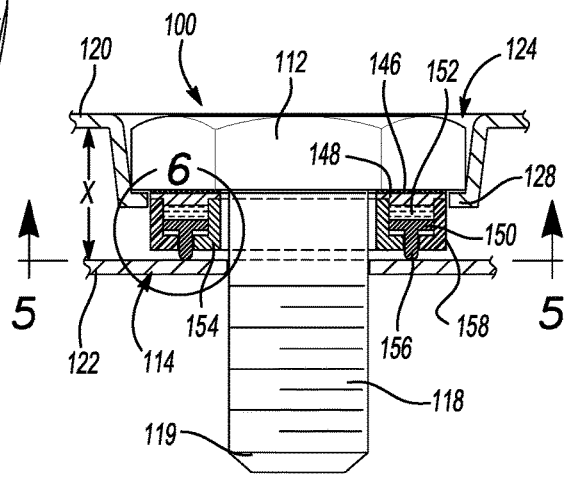
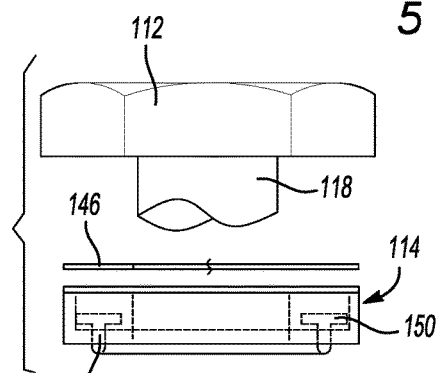
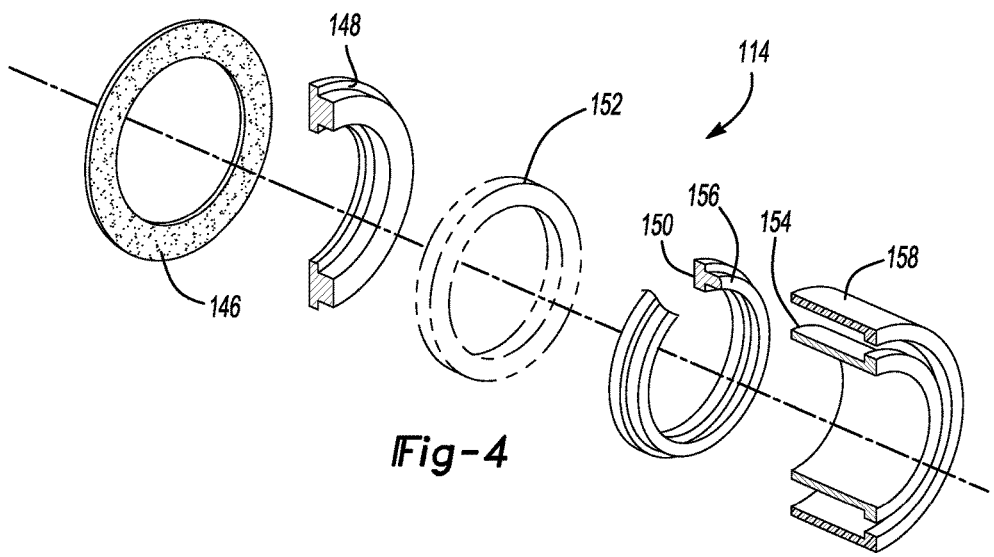
Fig-1
Fig-2
Fig-3
Fig-4

TRIM DAMPENING FASTENER

FIELD OF THE INVENTION

The present apparatus relates generally to a fastener. More particularly, the present apparatus relates to a fastener having an integrated dampener for preventing noise and vibration between panels.

BACKGROUND OF THE INVENTION

A common noise complaint from customers derives from the area between where two panels meet. More particularly, a common noise complaint comes where a trim panel connects to the sheet metal portion of a vehicle door. Typically, a trim panel is connected to sheet metal by means of a bolt, clip, or other fastener. These fasteners may include a rubber, polymer, or other elastomeric material positioned adjacent to, but not connected to, in order to reduce noise and vibration. Any elastomeric dampener presently used is installed separate from the fastener and away from the fastening site. These dampeners may be positioned between the panels but not connected to the fastener. Accordingly, there exists a need in the art to provide a fastener having an integrated dampening member to prevent noise and vibration and to increase ease of assembly.

SUMMARY OF THE INVENTION

The present apparatus is a fastener with a built in dampener. The dampener is integrated with the fastener thus eliminating the need for an additional dampener installation. The fastener includes a shaft, a head connected to the shaft, and a dampener connected to the head. The dampener includes a piston and a compression chamber that is adapted to reduce vibration and noise when installed between two panels. The dampener is mounted to the underside of the head of a bolt, or to a trim piece. In other embodiments, the dampener is connected to the head of a clip. The dampener is adapted to rest between the head of a bolt and an adjacent panel thereby slightly spacing out the bolt head from the panel, such as sheet metal.

In one embodiment the dampener includes a piston. The piston assembly includes a compression chamber which may be partially filled with a fluid. The fluid is preferably a compressible fluid. In other embodiments, the fluid is a hydraulic fuid. A piston is axially displaceable within the compression chamber thereby compressing the fluid. The piston is movable with respect to forces experienced on the fastener to include vibration and speaker noise.

In other embodiments, a spring is used in the dampener assembly. The spring is disposed on the underside of the head of the bolt and is sandwiched between the head of the bolt and the structure to which the clip is attached, such as sheet metal. The spring may be compressed or may expand in relation to forces experienced by the bolt. The spring may be contained in an elastomeric (plastic or rubber) housing allowing the spring to be easily installed. The elastomeric material also allows the walls of the housing to flex during compression.

The dampener may be adjusted to change the characteristics to match the necessary application based on the resonant frequency of the trim panel. Installation of the present apparatus would eliminate additional parts necessary to assemble the door and would eliminate rattle conditions that are caused by speaker output, engine or road vibrations.

BRIEF DESCRIPTION OF THE DRAWINGS

FIG. 1 illustrates a perspective environmental view of a door having a trim panel connected with fasteners having dampeners;

FIG. 2 illustrates a partial cross-sectional view of a bolt having a piston dampener assembly;

FIG. 3 illustrates a partially exploded view of a bolt having an annular dampener connected thereto;

FIG. 4 illustrates an exploded view of a piston dampener assembly;

DETAILED DESCRIPTION OF THE INVENTION

Figure 5:
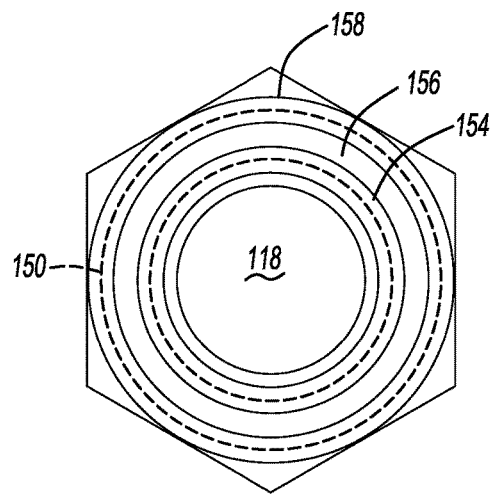
FIG. 5 illustrates a top view of a bolt having a piston dampener assembly.

A fastener is provided having a dampener assembly integrally connected thereto. The fastener is adapted to connect a trim panel to a body portion of a vehicle door. The dampener assembly is provided to reduce noise and vibration between the trim panel and the body panel. The dampener is connected to the underside of the head of a fastener and includes a piston assembly, spring assembly, or combination thereof.

The fastener of the present disclosure may be used on a vehicle 10 having a door 12. The door 12 includes a trim portion 120 connected to a body portion, such as illustrated in FIG. 1. A plurality of fasteners are used to connect the trim portion 120 to the body panel of the door 12.

A fastener 100 having a dampening assembly 114 is illustrated in FIGS. 2-6. FIG. 2 illustrates a partial cross-sectional view of a fastener 100 having a dampener assembly 114. The fastener includes a head 112 mounted to a shaft 118. The shaft 118 includes a plurality of threads 119 adapted to connect to a door panel 122. The fastener 100 is used to connect the trim panel 120 to the body panel 122 in a spaced apart configuration. The trim panel 120 includes an indentation 124 thereby allowing the head 112 of the fastener 100 to rest flush within the indentation 124. The dampener assembly 114 and indentation 124 space apart the body panel 122 from the trim panel 120 a distance X. This spacing and the inclusion of the dampener 114 prevents the panels 120, 122 from touching thereby reducing the likelihood of noise and vibration heard by the user caused from speaker, engine, or other road noise.

The dampener assembly 114 is annular and adapted to connect directly to the underside of the head 112 of the fastener 100. Connection of the dampener assembly 114 directly to the head 112 reduces additional assembly during installation.

Figure 6:
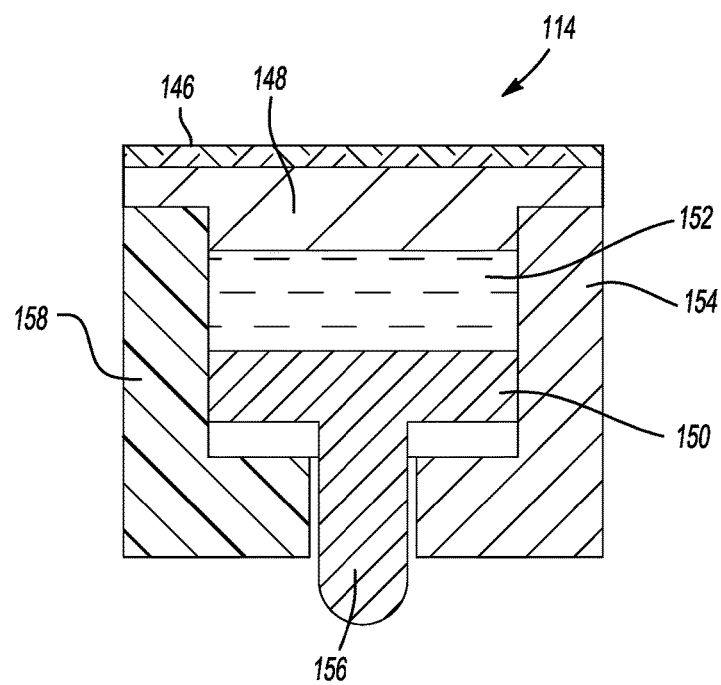
FIG. 6 illustrates a cross-sectional view of a portion of the annular piston dampener assembly.
Figure 8:
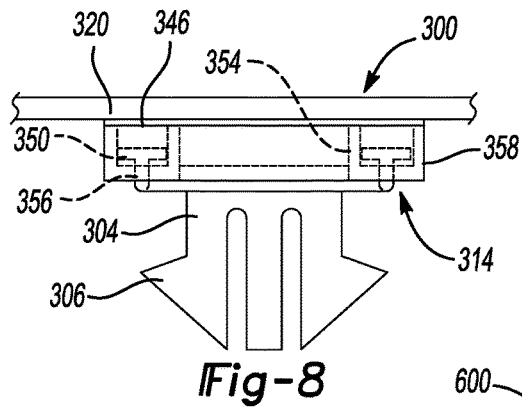
FIG. 8 illustrates a side view of a trim panel having a dampener assembly connected thereto including a clip.
Figure 9:
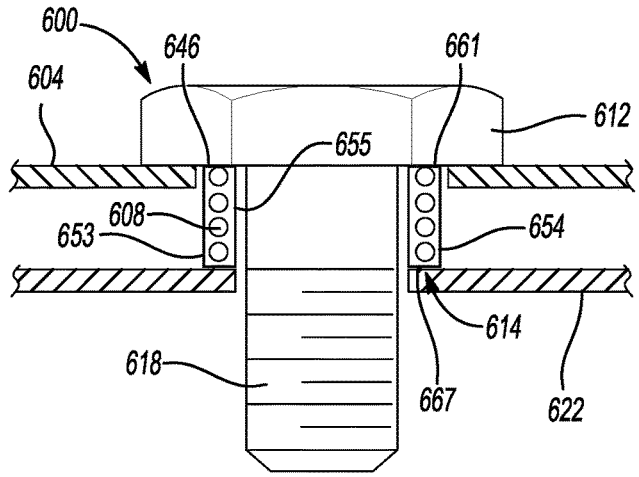
FIG. 9 illustrates an alternative embodiment of a bolt having a spring dampener assembly.
Figure 10:
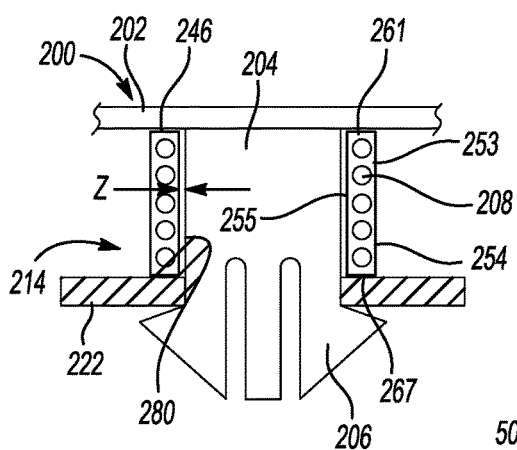
FIG. 10 illustrates a partial cross-sectional view of a trim panel having a fastener connected thereto with a spring dampener assembly.

The dampener assembly 114 includes an adhesive 146, a cap 148, a piston 150 connected to a piston rod 156, an inner housing 154 adapted to hold fluid 152, and an outer housing 158 made of an elastomeric material and adapted to shield the piston assembly from dust and other debris. An exploded arrangement of the components of the piston dampener assembly 114 is illustrated in FIG. 4. An assembled view of the components of the piston dampener assembly 114 is illustrated in FIG. 6. The piston 150 is adapted to rest within the inner housing 154 and the outer housing 158. A quantity of fluid 152 is placed within the space between the piston 150, the cap 148, and the side walls of the inner housing 154. The dampener 114 is annular. The annular configuration allows the dampener assembly to extend around the shaft 118 of the fastener 100. The dampener is adapted to directly connect to the underside of the head 112 of the fastener 100. In the present embodiment, the dampener assembly 114 is connected to the underside of the bolt head 112 by an adhesive 146. In other embodiments, a clip, small fasteners, welding, or other fastening techniques may be utilized. In other embodiments, the dampening assembly 114 is separate from the fastener and installed around the shaft of the bolt prior to installation.

The dampener assembly 114 includes the piston 150 connected to a piston rod 156. As shown in FIG. 2, the piston 150 has a width that is greater than a width of the piston rod 156. In some embodiments, an inner housing is not provided, such as illustrated in FIG. 3. However, in a preferred embodiment an outer housing 158 is provided allowing the piston rod 156 to connect thereto. The outer housing is made of an elastomeric or other flexible material allowing the outer walls of the housing 158 to bend when the piston is in compression. In some embodiments, the piston rod 156 connects or rests adjacent to the body panel 122. During compression of the piston, the body panel 122 exerts a force against the piston rod 156 to induce compression of the piston. The components of the dampener assembly 114 may be made of plastic, polymer, plastic like, polymer like, or metal materials depending on the needs of the user. The fastener 100 may also be made of metal or polymer, polymer like, plastic, plastic like, etc. materials.

It should be noted that any combination of dampener assemblies having pistons or springs may be combined with any trim, bolt head, clip head, bolt shaft, or clip structure. Several of these additional embodiments are illustrated in FIGS. 7-11.

It should be further noted that in the present embodiment, the dampener assembly is generally annular having a piston assembly which is also generally annular. In other embodiments, a plurality of sub piston assemblies may be positioned around and connected to the underside of the bolt head. In one embodiment, a plurality of four or more piston assemblies are integrated within the dampener assembly.

Figure 7:
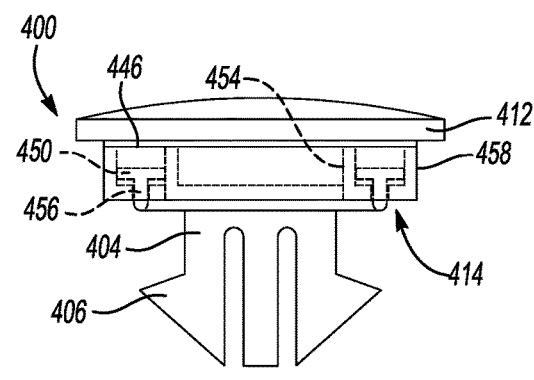
FIG. 7 illustrates an alternative embodiment of a clip having a dampener assembly.

FIG. 7 illustrates an alternative embodiment of a clip 400 having a dampener assembly 414. The clip 400 includes a clip head 412 connected to a partial shaft 404. The shaft 404 includes a clip structure 406 adapted to snap into place. The dampener assembly 414 is connected to the underside of the head 412 of the clip 400. The dampener assembly 414 is connected to the underside of the head 412 by an adhesive 446. In other embodiments, the dampener assembly 414 is connected to the head 412 by a fastener, clip, or other connecting means. The dampener assembly 414 includes the same parts such as shown in FIG. 4 including the piston 450 and the piston rod 456. The phantom views such as shown in FIG. 7 illustrate a partial phantom view of the outer housing 458 and the inner housing 454. Operation of the dampener assembly 414 is the same as the operation of a dampener assembly as shown in FIGS. 2-6.

In yet another alternative embodiment, a fastener assembly 300 is connected directly to a trim panel 320. The fastener assembly includes a shaft portion 304 having a clip structure 306. The dampener assembly 314 is connected directly to an underside of the trim panel 320. In the present embodiment, the dampener assembly 314 is connected to the underside of the trim panel 320 by an adhesive 346. The dampener assembly includes a piston rod 356 connected to a piston 350 mounted within the outer housing 358 and the inner housing 354. The dampener assembly 314 has similar characteristics and operates the same as the piston dampener assembly as illustrated in FIGS. 2-6.

In yet another embodiment, a fastener 600 is provided having a head 612 connected to a shaft 618. A dampener assembly 614 is provided connected to the underside of the head 612 of the fastener 600 by an adhesive 646. The dampener assembly 614 includes a spring 608 mounted therein. In the present embodiment, the dampener assembly 614 includes an elastomeric housing 654 having a pair of side walls 653, 655 connected to a pair of opposing upper and lower walls 661, 667. The upper wall 661 is directly connected to the underside of the head 612 by the adhesive 646. The lower wall 667 is adapted to rest against a body panel 622. The dampener assembly 614 is adapted to space apart the trim panel 604 from the body panel 622. As a force is exerted either against the trim panel 604 or the body panel 622, the dampener 614 is adapted to absorb any vibration thus reducing noise.

In yet another alternative embodiment, a fastener assembly 200 is provided directly connected to a trim panel 202. The fastener 200 includes a shaft portion 204 and a clip portion 206. In an installation, the trim panel 202 is mounted directly to the body panel 222 having an aperture disposed therein. The clip structure is adapted to extend through the aperture and snap into place. The fastener assembly 200 includes a dampener 214 having a spring 208 and an elastomeric housing 254. The elastomeric housing 254 includes opposing side walls 253, 255 and a pair of opposing upper and lower walls 261, 267. The upper wall 261 is adapted to connect to the underside of the trim panel 202. The upper portion 261 of the housing 254 connects to the underside of the trim panel 202 by an adhesive 246. It should be further noted that the dampener assembly 214 is spaced apart from the outer wall 280 of the shaft 204. This space allows the elastomeric material of the housing 254 to occupy that space during compression of the dampener assembly 214. The dampener assembly 214 is generally annular.

Figure 11:
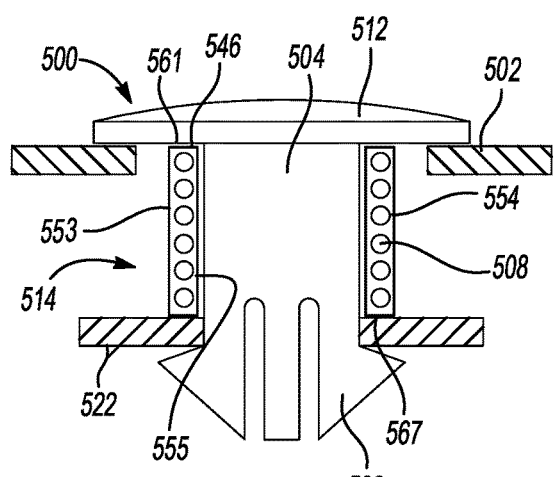
FIG. 11 illustrates yet another alternative embodiment of a clip having a spring dampener assembly connected thereto.

In yet another alternative embodiment, such as shown in FIG. 11, a fastener 500 is illustrated having a dampener assembly 514 mounted thereto. The fastener 500 is a clip having a head 512 and a shaft 504. The shaft 504 includes a clip structure 506 connected thereto adapted to be positioned through an aperture on the body panel 522. The clip is adapted to connect a trim panel 502 to the body panel 522. The dampener assembly 514 includes an elastomeric housing 554 having an upper wall 561, a lower wall 567, and two opposing side walls 553, 555. The upper wall 561 is adapted to connect to the underside of the head 512. In the present embodiment, the dampener is connected by an adhesive 546 to the underside of the head 512 of the fastener 500. A spring 508 is disposed within the housing to dampen forces exerted between the panels 502 and 522.

The invention is not restricted to the illustrative examples and embodiments described above. The embodiments are not intended as limitations on the scope. Methods, apparatus, compositions, and the like described herein are exemplary and not intended as limitations on the scope. Changes therein and other uses will occur to those skilled in the art. The scope of the invention is defined by the scope of the appended claims.

We claim:

1. A fastener assembly comprising:
   a head having an underside;
   a shaft extending downwardly from the underside of the head; and
   an annular dampener connected to the head, the annular dampener including a piston assembly, the annual dampener extending coaxially with the shaft, the annual dampener including a piston and a piston rod, the piston having a width greater than a width of the piston rod;
   wherein the annual dampener is adapted to reduce vibration and noise between two panels.

2. The fastener assembly of claim 1 wherein the annular dampener is integrally connected with the head of the fastener assembly.

3. The fastener assembly of claim 1 wherein the piston assembly includes a compression chamber filled with a compressible fluid.

4. The fastener assembly of claim 1 wherein an inner surface of the dampener is spaced apart from an outer surface of the shaft.

5. The fastener assembly of claim 1 wherein a housing is provided around the piston assembly of the dampener, the housing being an elastomeric material.

6. The fastener assembly of claim 1 wherein the head of the fastener assembly is integrally formed and a part of a trim panel, the shaft of the fastener assembly extending away from an underside portion of the trim panel.

7. The fastener assembly of claim 6 wherein the annual dampener is adapted to space apart the trim panel from a body panel.

8. The fastener assembly of claim 1 wherein the faster assembly is adapted to connect a trim panel to a body panel.

9. The fastener assembly of claim 8 wherein the dampener is adapted to space apart the trim panel from the body panel.

10. A fastener assembly comprising:
    a shaft;
    a head connected to the shaft; and
    an annular dampener connected to the head, the dampener including a spring and a housing formed of an elastomeric material provided around the spring, the spring positioned around the shaft, the dampener adapted to be positioned between the head of the shaft and a panel, the dampener adapted to reduce vibration and noise.

11. The fastener assembly of claim 10 wherein a housing is provided around the spring of the dampener, the housing being an elastomeric material.

12. The fastener assembly of claim 10 wherein the faster assembly is adapted to connect a trim panel to the panel.

13. The fastener assembly of claim 10 wherein an inner surface of the dampener is spaced apart from an outer surface of the shaft.

14. The fastener assembly of claim 10 wherein the head of the fastener assembly is integrally formed and a part of a trim panel, the shaft of the fastener assembly extending away from an underside portion of the trim panel.

15. The fastener assembly of claim 14 wherein the dampener is adapted to space apart the trim panel from a second panel.

16. A trim panel assembly having a trim panel and a body panel, the trim panel assembly comprising:
    a fastener integrally connected to an underside of the trim panel, the fastener including a shaft; and
    an annular dampener assembly positioned around the shaft of the fastener, the dampener assembly fixedly connected to the underside of the trim panel, the dampener assembly including a dampener and a housing formed of an elastomeric material provided around the dampener;
    wherein the dampener assembly is adapted to reduce vibration between the trim panel and the body panel when the trim panel is connected to the body panel.

17. The trim panel assembly of claim 16 wherein the dampener is adapted to space apart the trim panel from the body panel.

18. The trim panel assembly of claim 16 wherein the dampener includes a piston.

19. The trim panel assembly of claim 16 wherein the dampener includes a spring.

20. The trim panel assembly of claim 16 wherein a housing is provided around the dampener, the housing being an elastomeric material.

* * * * *